United States Patent [19]

Fukumura et al.

[11] Patent Number: 5,692,962
[45] Date of Patent: Dec. 2, 1997

[54] ATTACHING CONSTRUCTION OF A RESIN BOOT TO A MATING MEMBER

[75] Inventors: Yoshikazu Fukumura, Iwata; Kenji Terada, Shizuoka-ken; Takeshi Ikeda, Iwata; Shin Tomogami, Shizuoka-ken; Toshiyuki Oki, Iwata, all of Japan

[73] Assignee: NTN Corporation, Osaka-Fu, Japan

[21] Appl. No.: 417,871

[22] Filed: Apr. 7, 1995

[30] Foreign Application Priority Data

Apr. 12, 1994 [JP] Japan ................................. 6-072995

[51] Int. Cl.⁶ ............................................. F16D 3/84
[52] U.S. Cl. ................................... 464/173; 277/212 FB
[58] Field of Search ................................. 464/170, 173, 464/175; 277/212 FB, 101

[56] References Cited

U.S. PATENT DOCUMENTS

| | | | |
|---|---|---|---|
| 3,583,244 | 6/1971 | Teinert | 464/173 X |
| 3,807,195 | 4/1974 | Faulbecker | 277/212 FB X |
| 4,210,002 | 7/1980 | Doré | 464/175 |
| 4,456,269 | 6/1984 | Krude et al. | 464/175 X |
| 4,673,188 | 6/1987 | Matsuno et al. | 464/175 X |
| 4,957,469 | 9/1990 | Zollinger | 464/175 |

FOREIGN PATENT DOCUMENTS

| | | | |
|---|---|---|---|
| 402225826 | 9/1990 | Japan | 464/170 |
| 119122 | 6/1947 | Sweden | 464/173 |

Primary Examiner—Daniel P. Stodola
Assistant Examiner—Eileen A. Dunn
Attorney, Agent, or Firm—Nikaido Marmelstein Murray & Oram LLP

[57] ABSTRACT

To reduce the cost in a resin boot attaching construction, a groove depth a and groove width b of engaging groove 21 and the height c and width d of ridges 22 are set within the following dimensional ranges:

$a = 0.5–1.5$ mm
$b = 3.0–5.0$ mm
and $b/a \geq 3$
$c = 0.1–0.5$ mm
$d = 1.0–0.$ mm (where $d=0$, the ridges 22 become edges.)
The width of the boot band is wider than the width of the groove.

1 Claim, 3 Drawing Sheets

5,692,962

ATTACHING CONSTRUCTION OF A RESIN BOOT TO A MATING MEMBER

BACKGROUND OF THE INVENTION

The present invention relates to a construction for attaching a resin boot to a constant velocity universal joint for automobiles or the like.

As for a construction for attaching a resin boot to a mating member, constructions shown in FIGS. 4 and 5 have heretofore been known.

The attaching construction shown in FIG. 4 is designed such that after a boot fixing portion 41 of a resin boot has been fitted on the outer periphery of an mating member 42 (the outer ring of a constant velocity joint or a shaft), the boot fixing portion 41 is clamped by a boot band 43 to be deformed elastically, thereby an annular convex portion 44 formed on the inner periphery thereof is closely engaged with an engaging groove 45 formed on the outer periphery of the mating member, thereby fixing the resin boot An position. In addition, FIG. 4 shows the state with the boot band 43 applied thereto for clamping.

An attaching construction shown in FIG. 5 comprises pluralities of engaging grooves 52 and ridges 53 alternately formed on the outer periphery of a mating member 51 so as to be positioned close to each other, the arrangement being such that the ridges 53 are forced into the inner periphery of a boot fixing portion 55 by a clamping force exerted by a boot band 54, thereby fixing the resin boot in position. In addition, FIG. 5 shows the state prior to clamping by the hoot band 54.

In the attaching construction shown in FIG. 4, sauce the engaging groove 45 is angularly shaped. It has to be formed by lathing (using a cut-off tool), the machining cost being higher than the engaging groove machining cost in the case of a rubber boot. Furthermore, in order to secure slip-off preventing strength and sea, ability for the boot fixing portion 41, it is necessary to increase the height h of the convex portion 44 of the boot fixing portion 41; therefore, the resin boot molding method has been limited (usually, the direct blow method for molding using inner and outer molds is used), which also forms a major cause of high cost. Further, generally a resin boot has a hardness of as high as HD 50 and can be less easily elastically deformed than a rubber boot, thus raising a problem that if the convex portion 44 is too high. The operation for fitting it in the mating member 42 is difficult.

On the other hand, in the attaching construction shown in FIG. 5, since pluralities of engaging grooves 52 and ridges 53 are alternately formed to be positioned close to each other, lathing (using a cut-off tool) is also necessary for machining the engaging grooves 52, leading to high cost as in the above.

SUMMARY OF THE INVENTION

Accordingly, the present invention makes it an object to reduce the cost in a resin boot attaching construction while securing high slip-off preventing strength and sealability.

In the present invention, the engaging groove of the mating member is shaped such that its groove shoulders are in the form of ridges and the ratio (b/a) or the groove width b to the groove depth a is 3 or more.

Since the groove shoulders of the engaging groove are in the form of ridges, the inner periphery of the boot fixing portion is strongly pressed by the ridges when the boot fixing portion is elastically deformed under the clamping force exerted by the boot band, with the result that the stresses are locally increased in the pressed regions. For this reason, the elastic deformation of the boot fixing portion is enhanced to make it easier for the inner periphery of the boot fixing portion to move toward the engaging groove. Further, after fixing by clamping, the ridges cut into the inner periphery of the boot fixing portion to hold it, the slip-off preventing strength and sealability of the boot fixing portion are high.

The reason why the ratio b/a of the groove width b to the groove depth a is determined to be 3 or more is that it is desired to shape the engaging groove such that it can be profile-machined. If the b/a is less than 3, it cannot be machined by ordinary profile machining.

Since the engaging groove of the mating member is shaped such that its groove shoulders are in the form of ridges and such that the ratio (b/a) of the groove width b to the groove depth a is 3 or more, even if the height of the convex portion formed on the inner periphery of the boot fixing portion is relatively small, a strong engaging contact force between it and the engaging groove is obtained, making it possible to secure a high slip-off preventing force and sealability for the boot fixing portion. Further, since it is possible to employ as a resin boot molding method, not only direct blow which uses inner and outer molds but also press blow which uses an outer mold alone, it is possible to reduce the molding cost of resin boots. Furthermore, workability in fitting the boot fixing portion on the outer periphery of the mating member is improved. Further, since the engaging groove is shaped for profile machining, the machining cost of the engaging groove is reduced.

The present invention, through its effects described above, contributes to increasing the slip-off preventing strength, improving sealability and workability and reducing the machining cost of resin boots.

The present invention will now be described with reference to embodiments.

DESCRIPTION OF THE PREFERRED EMBODIMENTS

Figure 1A:
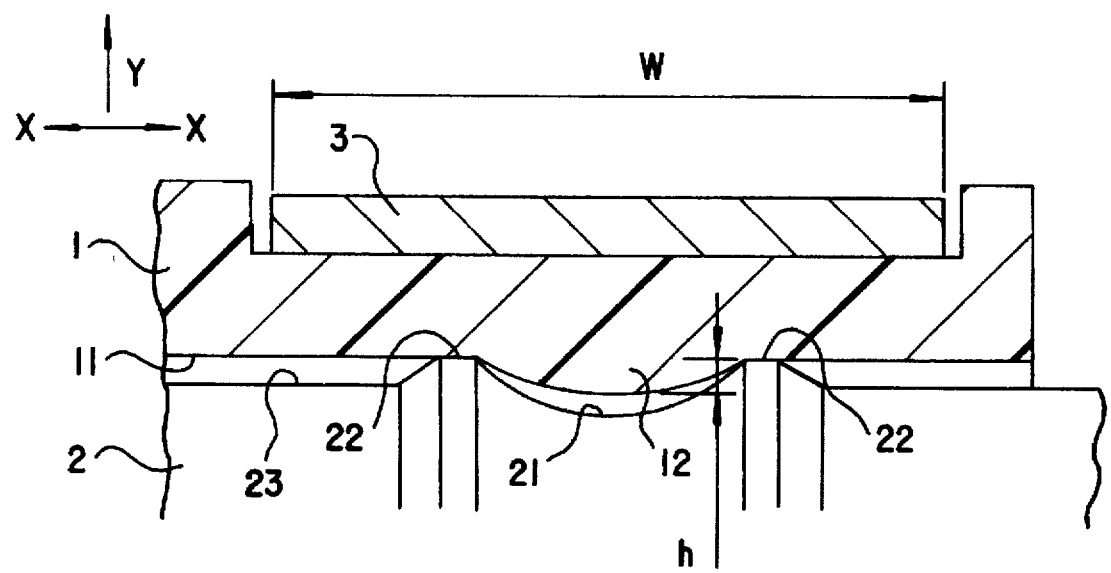
FIGS. 1a and 1b are sectional views showing the vicinity of a boot fixing portion according to an embodiment (FIG. 1a), and a side view showing the vicinity of an engaging groove in a mating member (FIG. 1b)

FIG. 1 shows a state (prior to clamping) in which the boot fixing portion 1 of a resin boot fitted on the outer periphery of a mating member 2 (the outer ring of a constant velocity universal joint, or shaft). The resin boot is made of resin material, such as TPEE (thermoplastic polymer elastomer) or urethane, by injection molding, blow molding or the like, and comprises as a unit alternate ridges and Troughs, a bellows portion (not shown) shaped such that the ridge diameter gradually decreases from one end to the other, and cylindrical boot fixing portions continuous with and extending from the opposite ends (larger and smaller ends) of the bellows portion. FIG. 1 shows only the vicinity of one of the boot fixing portions at the larger and smaller diameter sides. Since the vicinity of the other boot fixing portion is of the same arrangement, it is omitted from the illustration and description.

Figure 1B:
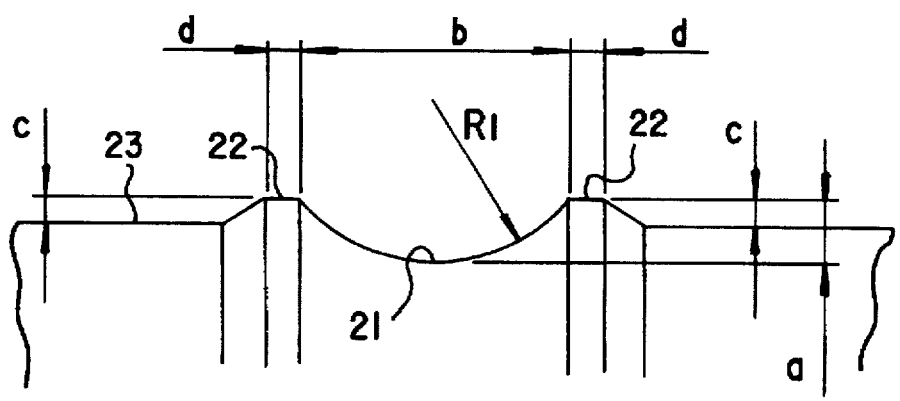

The inner periphery 11 of the boot fixing portion 1 is integrally formed with an annular convex portion 12. The boot fixing portion 1 is axially positioned by fitting the convex portion 12 in an annular engaging groove 21 formed on the outer periphery of 23 of a mating member 2. As shown in FIG. 1b, in the case of this embodiment, the engaging groove 21 is an arcuate groove having a radius of curvature of R1, with its two groove shoulders projecting from the outer periphery 23 of the mating member 2 to form annular ridges 22.

Figure 6:
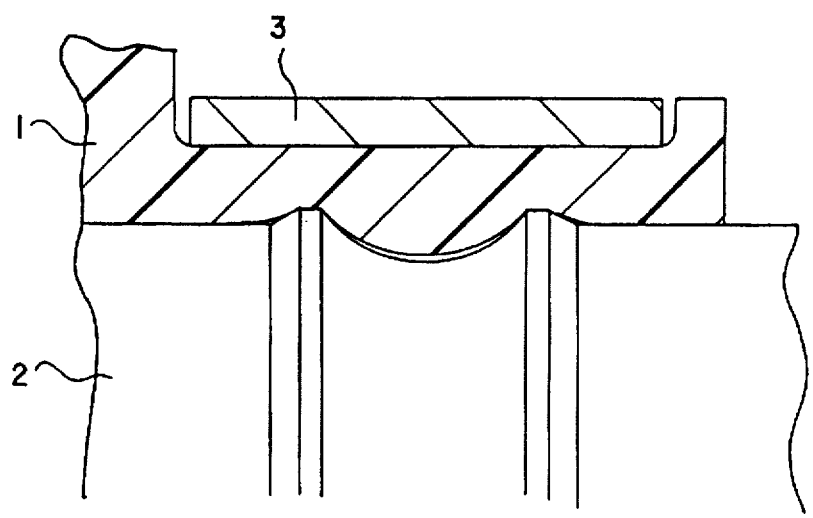
FIG. 6 is a sectional view showing the vicinity of a boot fixing portion of FIG. 1a in the clamped position with the ridges cutting into the boot.

After the boot fixing portion 1 has been fitted on the outer periphery of the mating member 2 in the manner described above, it is fixed in position by being clamped by a boot band 3 mounted on the outer periphery thereof. As for the boot band 3, use is made generally of a one-touch band, Oetiker type band or the like, which can be forcibly decreased in diameter after having been mounted on the outer periphery of the boot fixing portion 1. In this manner, during fixing the boot fixing portion 1 in position by clamping using the boot band 3, the boot fixing portion 1 is pressed toward the inner diameter side by the clamping force exerted by the boot band 3 to produce elastic deformation, with the convex portion 12 moving toward the engaging groove 21 see FIG. 6. Since the two groove shoulders of the engaging groove 21 are in the form of ridges 22, when the boot fixing portion 1 is elastically deformed under the force of the boot band 3, the inner periphery 11 of the boot fixing portion 1 is strongly pressed by the ridges 22 on opposite sides of the convex portion 12, with the stresses in this region locally increased, whereby the elastic deformation of the boot fixing portion 1 is enhanced, making it easier for the convex portion 12 to move toward the engaging groove 21. Further, after fixing by clamping, the ridges 22 cut into the inner periphery 11 of the boot fixing portion 1 to hold the latter; thus, the slip-off preventing strength and sealability of the boot fixing portion 1 are high.

In this embodiment, the groove depth a and groove width b of the engaging groove 21 and the height c and width d of the ridges 22 shown in FIG. 1b are set within the following dimensional ranges, a=0.5–1.5
b=3.0–5.0 mm
and b/a≧3
c=0.1–0.5 mm
d=1.0–0 mm (where d=0, the ridges 22 become edges.)

The groove width b has been set within the above-indicated dimensional range on the basis of the width w of the boot band 3 (usually, w=8–12 mm) so that when the boot band 3 is tightened, the ridges 22 stably cut into the inner periphery 11 of the boot fixing portion 1.

The groove depth a has been set within the above-indicated dimensional range so that when the boot band is tightened, the convex portion 12 of the boot fixing portion 1 reliably engages the engaging groove 21 to ensure that even if the boot fixing portion 1 is subjected to a force in the direction X or the resultant of forces in the directions X and Y, there is obtained a sufficient fixing force to prevent the boot fixing portion from deviating relative to the marine member 2.

The reason for b/a≧3 that it is desired to shape the engaging groove 21 such that it can be profile-machined. Thereby, it is intended to reduce the machining cost of the engaging groove 21. In addition if b/a<3, it is impossible to machine it by ordinary profile machining and lathing (using a cut-off tool) is required.

The height c of the ridges 22 has been set within above-indicated dimensional range so that when the boot band 3 is tightened, the ridges 22 reliably cut into inner periphery 11 of the boot fixing portion 1 and the inner periphery 11 of the boot fixing portion 1 fits on the outer periphery 23 of the mating member 2 with no clearance defined therebetween.

The width d of the ridges 22 has been set within the above-indicated dimensional range so that when the boot band 3 is tightened, the ridges 22 reliably cut into the inner periphery 11 of the boot fixing portion 1.

In this embodiment, since the size and shape of the engaging groove 21 of the mating member 2 are set on the basis of the aforesaid criteria, even if the height h of the convex portion 12 of the boot fixing portion 1 is made relatively small, a strong engaging contact force between it and the engaging groove 21 is obtained, making it possible to secure a high slip-off preventing force and sealability for the boot fixing portion 1. Further, reducing the height h of the convex portion 12 makes it possible to employ, as a resin boot molding method, not only direct blow which uses inner and outer molds but also press blow which uses an outer mold alone, thus making it possible to reduce the molding cost of resin boots. Furthermore, reducing the height h of the convex portion 12 improves workability in fitting the boot fixing portion 1 on the outer periphery of the mating member 2. Further, since the engaging groove 21 is shaped for profile machining, the machining cost of the engaging groove 21 is reduced. In addition, the height h of the convex portion 12 may be of a degree such that when the boot fixing portion 1 is to be fitted on the outer periphery of the mating member 2, the axial positioning of the boot fixing portion 1 can be made by the convex portion 12 fitting in the engaging groove 21

Figure 2:
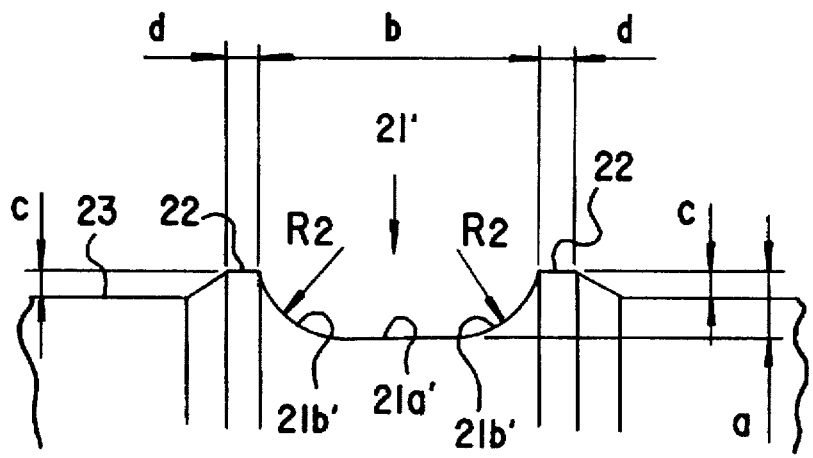
FIG. 2 is a side view showing the vicinity of an engaging groove in a mating member according to another embodiment.

In an embodiment shown in FIG. 2, the central region of the engaging groove 21' is a flat surface 21a' parallel with the axis, the surface 21a' being made smoothly continuous with the arcuate surfaces 21b' (with a radius of curvature R2) of the groove shoulders. The groove depth a, groove width b of the engaging groove 21', and the height c and width d of the ridges 22 are set on the basis of the aforesaid criteria. Therefore, the engaging groove 21' in this embodiment also is capable of being profile-machined.

Figure 3:
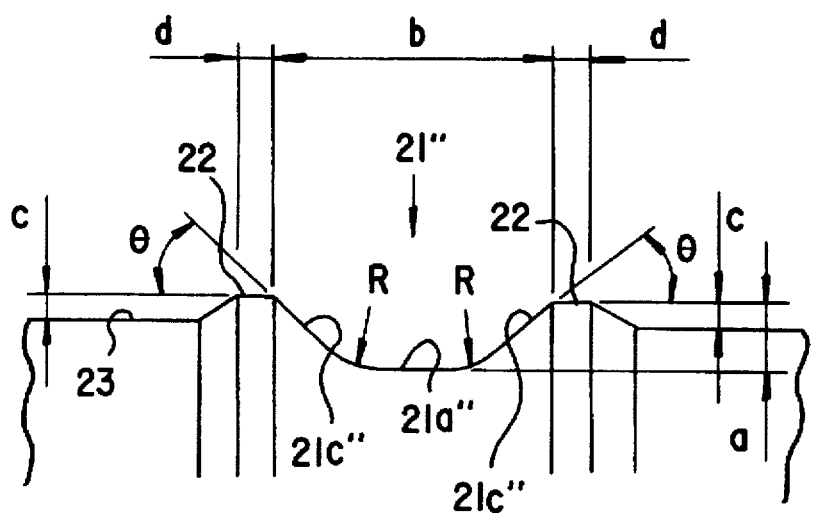
FIG. 3 is a side view showing the vicinity of an engaging groove in a mating member according to another embodiment.
Figure 4:
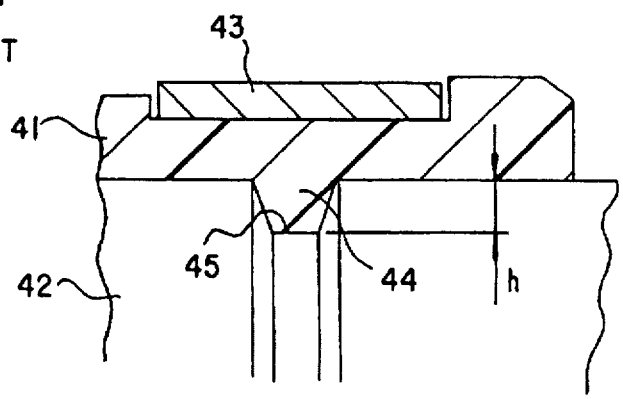
FIG. 4 is a sectional view showing the vicinity of a boot fixing portion according to a prior art arrangement.
Figure 5:
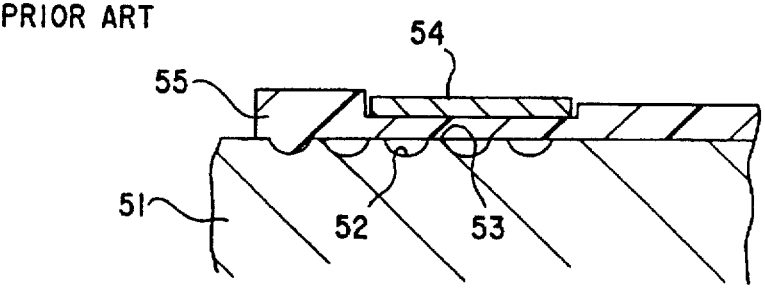
FIG. 5 is a sectional view showing the vicinity of a boot fixing portion according to a prior art arrangement.

In an embodiment shown in FIG. 3, the central region of the engaging groove 21" is a flat surface 21a" parallel with the axis, the surface 21a" being made smoothly continuous with the straight inclined surfaces 21c" of the opposed groove shoulders by use of R-surfaces. The radius of curvature of the R-surfaces is the same, for example, as the nose diameter of a machining tool (tip). The angle of inclination θ of the inclined surfaces 21c" is, for example, about 25–30 degrees. The groove depth a and groove width b of the engaging groove 21" and the height c and width d of the ridges 22 are set on the basis of the aforesaid criteria. Therefore, the engaging groove 21" in this embodiment also is capable of being profile-machined.

In addition, the shape of the engaging groove 21 is not limited to those shown by way of example above, it being only necessary to shape is such that the groove shoulders are in the form of ridges and such that b/a≧3.

What is claimed is:

1. An attaching construction attaching a resin boot to a mating member comprising:

a cylindrical boot fixing portion formed at an end of said resin boot, said cylindrical boot fixing portion having an outer peripheral surface, and an inner peripheral surface being integrally formed with an annular convex portion;

said mating member having an outer peripheral surface on which said cylindrical boot fixing portion is fixed in position, said outer peripheral surface thereof being formed with an annular groove, and annular ridges having a first side, projecting from said outer peripheral surface of said mating member by a predetermined amount and said annular ridges having a second side continuous to said annular groove; and a boot band fitted on said outer peripheral surface of said cylindrical boot fixing portion, wherein a ratio (b/a) of a width (b) of said annular groove to a depth (a) of said annular groove is at least three, and a width of said boot band is wider than the width of said annular groove, and wherein said inner peripheral surface of said cylindrical boot fixing portion is pressed against said annular ridges by a clamping force of said boot band, and wherein after clamping, said ridges cut into said inner peripheral surface of said cylindrical boot fixing portion, said annular convex portion firmly engages with said annular groove and said inner peripheral surface of said cylindrical boot fixing portion fits on said outer peripheral surface of said mating member on said first side of said annular ridges.

* * * * *